United States Patent [19]

Scott et al.

[11] Patent Number: 4,856,839
[45] Date of Patent: Aug. 15, 1989

[54] SELF PROPELLED CARRIER

[76] Inventors: Harold C. Scott, 2587 W. Armstrong Rd.; Carl O. Martin, 1364 Fairchild Rd., both of Salina, Kans. 67401

[21] Appl. No.: 123,767

[22] Filed: Nov. 23, 1987

[51] Int. Cl.⁴ ............................................. B60P 3/00
[52] U.S. Cl. .................................. 296/24.2; 296/164; 180/14.2
[58] Field of Search .................. 296/24 C, 24 R, 156, 296/164, 183, 204; 29/401.1; 180/14.2

[56] References Cited

U.S. PATENT DOCUMENTS

| Re. 32,647 | 4/1988 | Wilson | 296/182 X |
|---|---|---|---|
| 2,794,650 | 2/1955 | Schilberg | 296/204 X |
| 3,405,778 | 10/1968 | Marfin | 296/183 X |
| 3,563,596 | 2/1971 | Davis | 296/158 |
| 4,231,144 | 11/1980 | Bernacchia | 29/401.1 |
| 4,343,506 | 8/1982 | Soltzman | 296/24 C X |

FOREIGN PATENT DOCUMENTS

| 426516 | 7/1924 | Fed. Rep. of Germany | 296/28 |
|---|---|---|---|
| 3230864 | 2/1984 | Fed. Rep. of Germany | 296/156 |
| 269409 | 4/1927 | United Kingdom | 296/24 C |
| 461609 | 2/1937 | United Kingdom | 296/24 C |

Primary Examiner—Robert B. Reeves
Assistant Examiner—Brian Sells
Attorney, Agent, or Firm—Kokjer, Kircher, Bradley, Wharton, Bowman & Johnson

[57] ABSTRACT

A self propelled vehicle which provides a trailer compartment for transporting horses and other animals and living quarters for humans. A cab has a frame which is connected with the trailer frame by a special connection system that enhances the strength and rigidity of the frame. The cab body and trailer body are welded together with flat steel plates. The vehicle provides a low elevation for the trailer floor to facilitate loading and unloading of animals. Front wheel drive propulsion eliminates the need for a drive line to the rear wheels which would interfere with the low to the ground floor.

3 Claims, 1 Drawing Sheet

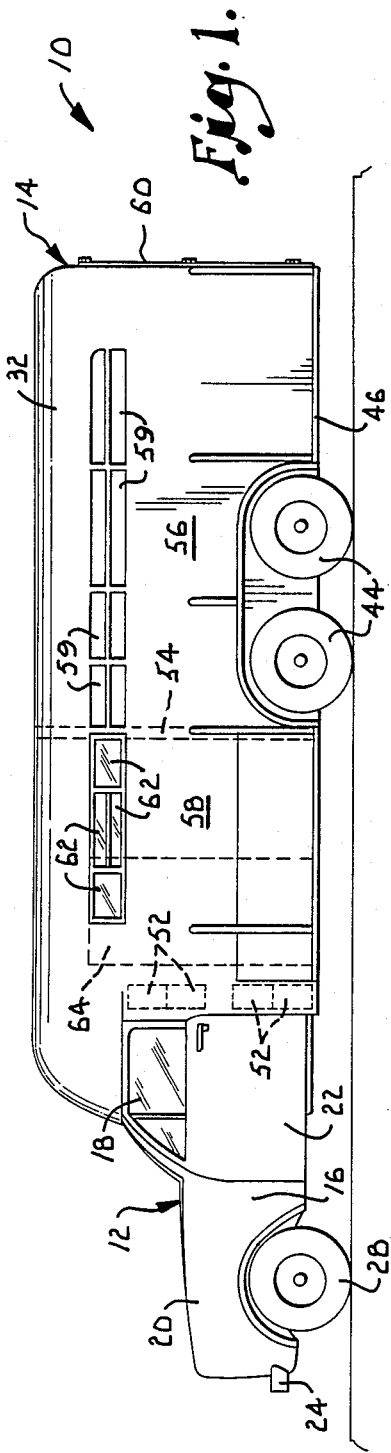
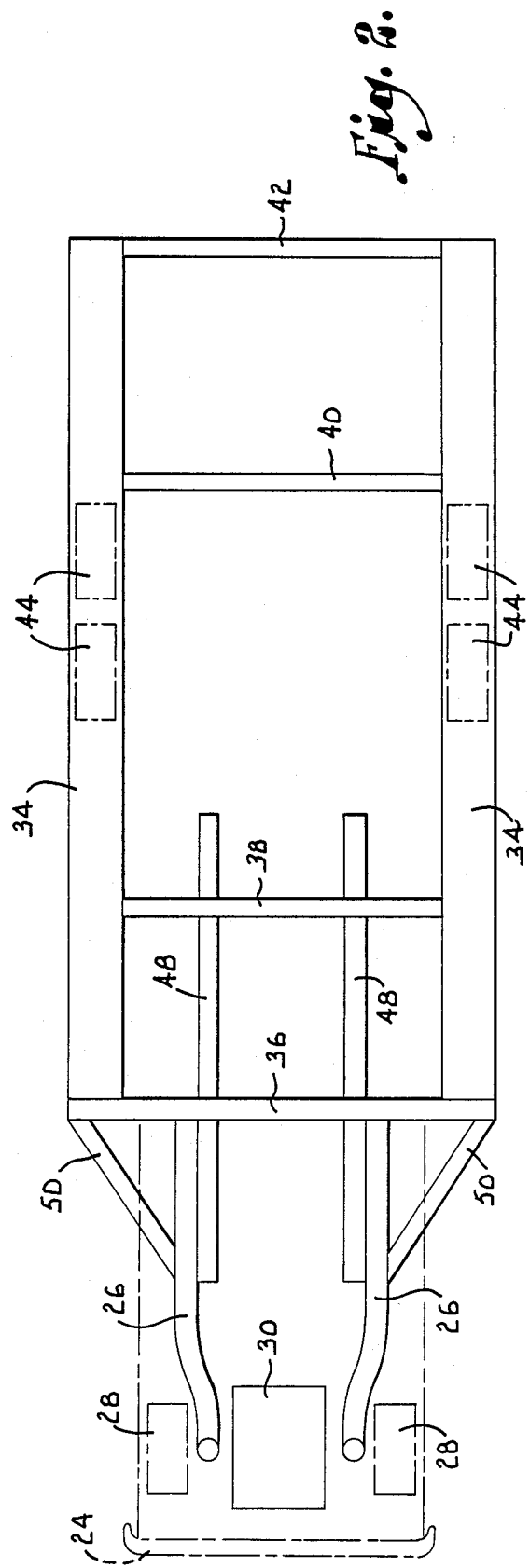

SELF PROPELLED CARRIER

BACKGROUND AND SUMMARY OF THE INVENTION

This invention relates generally to the transporting of animals and more particularly to a self propelled vehicle which provides a trailer for horses and other animals along with human living quarters.

Horses, dogs and other animals are often transported over the road to shows and racing events in trailers towed by "camper" type vehicles which provide living accommodations for the owner at the site of the show or race. Although this allows the animal owner to remain near his animals in order to tend to them, considerable expense is incurred because of the need for two separate vehicles, one to provide towing capability and living quarters and the other to provide the animal stalls.

The present invention is directed to a self propelled carrier for horses, dogs and other animals. The carrier could, of course, also be used for carrying other items if desired. In accordance with the invention, a truck cab and a horse trailer are connected to form a unitized structure which is able to transport animals over the road and at the same time provide human living accommodations. The frame of the cab portion of the vehicle is connected with the trailer frame by angle members which are connected with fore and aft frame members of the cab frame and with transverse frame members of the trailer frame. The frame connections are strengthened and reinforced by braces which angle between the frame members of the cab and trailer and are welded in place near the connections between the two frames. The cab body and trailer body are welded together with steel plates. The trailer body is partitioned to provide animal stalls at the rear and human living quarters at the front, with a side door providing access to the living quarters and a rear door providing access to the animal stalls.

It is an important feature of the invention that the carrier vehicle retains the low profile of a horse trailer so that the trailer floor is low to the ground in order to facilitate loading and unloading of animals. Preferably, the height of the floor is no more than about one foot. The floor of the trailer is maintained at a low elevation by making use of front wheel drive propulsion and eliminating the need for drive lines extending to the rear wheels. The manner in which the frames are connected allows the trailer to be maintained at a low elevation while providing the vehicle with sufficient structural strength to handle the considerable loads that are imposed in normal service.

DETAILED DESCRIPTION OF THE INVENTION

In the accompanying drawing which forms a part of the specification and is to be read in conjunction therewith and in which like reference numerals are used to indicate like parts in the various views:

FIG. 1 is a side elevational view of a self propelled animal carrier constructed according to a preferred embodiment of the present invention; and FIG. 2 is a diagrammatic top plan view showing the manner in which the frame of the vehicle is constructed.

Referring now to the drawing in more detail, numeral 10 generally designates a self propelled carrier vehicle which provides both an animal trailer and human living quarters. The vehicle 10 includes a cab portion 12 and a trailer portion 14 which are rigidly connected to one another to form a unitized structure. The cab 12 may be the cab from a conventional "pick up" type truck equipped with front wheel drive. A cab includes a body portion 16 which provides an enclosed driver's compartment 18 and an engine compartment 20 in front of the driver's compartment. Doors 22 on opposite sides of the cab body provide access to the driver's compartment 18. A front bumper 24 is mounted on the front of the cab body.

As shown in FIG. 2, the cab body 16 is mounted on a rigid frame which includes a pair of generally parallel frame members 26 which extend fore and aft. The frame members 26 are rigid and mount the frame on a pair of driven front wheels 28. The wheels 28 are driven by a conventional gasoline engine 30 which is mounted in the engine compartment 20 and connected with the driven front wheels 28 by a suitable drive system. In constructing the carrier vehicle 10, the cab 12 is severed from the remainder of the truck and is rigidly connected with the trailer 14 in a manner that will subsequently be described.

The trailer 14 may be a conventional horse trailer which includes a trailer body 32 mounted on a rigid frame. The frame of the trailer 14 is best shown in FIG. 2 and includes fore and aft frame members 34 on its opposite sides, a transverse frame member 36 extending between and connected with members 34 at their front ends, and additional transverse frame members 38, 40, and 42 which likewise extend between the side members 34. The trailer frame is mounted on two pairs of rear wheels 44. Trailer 14 has a horizontal floor 46 which is supported on the trailer frame and maintained at a low elevation, preferably no more than about twelve inches above the ground.

In accordance with the present invention, the cab frame and trailer frame are connected together in a special manner which provides the vehicle 10 with the necessary structural strength while at the same time maintaining the low elevation of the floor 46. The frame connection arrangement includes a pair of rigid angle members 48 which extend parallel to one another generally fore and aft. The angle members 48 overlap at their forward ends with the rearward ends of the respective cab frame members 26, and the overlapped portions of members 26 and 48 are preferably welded together along the entire area of the overlap. Preferably, members 26 and 48 overlap one another for a considerable length (approximately three feet in the preferred embodiment of the invention), so that substantial areas are welded together to enhance the structural strength of the frame. The angle members 48 extend beneath and are welded to the forward transverse member 36 and the next transverse member 38 of the trailer frame, thus rigidly securing the cab and trailer frames together. Preferably, the back ends of the cab frame members 26 butt against and are welded to the forward transverse member 36 of the trailer frame.

The connections between the cab and trailer frames are strengthened and reinforced by a pair of braces 50 which preferably take the form of angle members. The back ends of braces 50 are welded to the opposite ends of the forward frame member 36 of the trailer frame. The forward ends of braces 50 are welded to the respective cab frame members 26 at locations adjacent the forward ends of angle members 48. The braces 50 thus extend between and are secured to the cab frame members 26 and the trailer frame member 36, and it is noted that the braces 50 angle outwardly as they extend rearwardly from members 26 toward member 36. This construction provides the opposite sides of the frame with rigid triangular configurations formed by braces 50, the opposite end portions of member 36, and the rearward end portions of members 26 (along with the overlapped parts of angles 48). The rigidity provided by these triangular shapes enhances the structural strength of the frame for the carrier vehicle 10.

As shown in FIG. 1, the cab body 16 is spliced at its back end to the front end of the trailer body 32. The splice is located behind the cab door 22 and is reinforced by a plurality of flat steel plates 52 which are applied to the splice and which partially overlap the cab body 16 and partially overlap the trailer body 32. Each plate 52 is welded to the cab body 16 and to the trailer body 32 so that the bodies are rigidly secured together to form a unitized structure. The plates 52 are located on the inside of the vehicle body where they are not visible.

A transverse partition 54 is mounted within the trailer body 32 in order to divide the interior of trailer 14 into an animal compartment 56 located behind partition 54 and human living quarters 58 located in front of partition 54 between the driver's compartment 18 and the animal compartment 56. The animal compartment 56 is provided on opposite sides of trailer 14 with openings 59 which provide ventilation of the animal compartment. A door 60 on the back end of the trailer body 32 provides access to the animal compartment 56 and permits animals to be loaded into and unloaded from the trailer.

The living quarters 58 may be furnished in any desirable manner. Windows 62 may be provided on opposite sides of the living quarters 58. Access to the living quarters is provided by a door 64 located on one side of the trailer body 32.

In one embodiment of the invention, the animal compartment 56 is approximately 8 feet, 8 inches long and approximately 6 feet wide. The living quarters 58 is approximately 7 feet, 4 inches long and 6 feet wide. However, these dimensions can vary. It has been found that a trailer with the dimensions specified herein are sufficient to provide two horse stalls side by side in the animal compartment 56 and to provide adequate space within the human living quarters 58.

In use, horses and other animals can be loaded into the animal compartment 56 in order to transport them over the road between animal shows or racing events. The vehicle can be parked at the site of the event, and the owner can occupy the living quarters 58 for the duration of the event. This permits the owner to remain in close proximity to the animals so that he can tend to them without great difficulty. In addition to horses, dogs and other animals can be transported in the animal compartment 56 in cages or otherwise.

Because the trailer floor 46 is low to the ground, horses can easily be loaded into and unloaded from the trailer compartment 56 through the rear door 60. The low to the ground location of floor 46 requires the trailer frame to be low to the ground and does not provide enough room for drive lines to the rear wheels. Consequently, the vehicle 10 incorporates front wheel drive in order to eliminate the need for rearwardly extending drive systems and most at the same time exhibit considerable structural strength in order to withstand heavy loads. The rigidity and strength provided by the special way in which the cab and trailer frames are joined together provides the vehicle 10 with the considerable structural strength that is necessary and at the same time permits the trailer floor to be located about 12 inches above the ground to facilitate loading and unloading of horses and other animals.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense. For example, it is apparent that the novel carrier of the invention will have primary utility for the transport of animals because of the case of loading and unloading afforded by the low construction. On the other hand, the novel construction embodied in the invention can also be used to good advantage for the transport of other items as well.

Having thus described the invention, I claim:

1. A self propelled vehicle for carrying animals, comprising:
   a cab portion having a rigid cab frame supported on a pair of front wheels and a cab body on the cab frame providing an enclosed driver's compartment, said cab frame having a pair of spaced apart frame members extending generally fore and aft;
   an engine compartment on said cab frame having an engine therein drivingly connected with said front wheels to propel the vehicle;
   a trailer portion having a rigid trailer frame supported on rear wheels and a trailer body on the trailer frame providing an enclosed trailer compartment accessible from the rear to accommodate entry of animals into the trailer compartment, said trailer frame having a plurality of transverse frame members extending generally transversely across the trailer frame;
   a floor of said trailer compartment support on the trailer frame at a low to the ground elevation to facilitate loading of animals into the trailer compartment and unloading of the animals therefrom;
   a pair of structural members extending along and rigidly secured to said frame members of the cab frame and rigidly secured to said frame members of the trailer frame, thereby rigidly connecting the cab and trailer frames together;
   a pair of braces extending from the respective frame members of the cab frame to one of said frame members of the trailer frame, said braces angling outwardly away from the frame members of the cab frame and being rigidly connected to said frame members of the cab frame and to said one frame member of the trailer frame to reinforce the connection between the cab and trailer frames; and
   means for rigidly securing said cab body and said trailer body together to connect said cab and trailer portions together in a unitized structure, said securing means including a rigid metal plate at a junction between the cab body and trailer body, said plate being secured rigidly to said cab and trailer bodies on opposite sides of said junction.

2. The invention of claim 1, including:

means for partitioning said trailer body to provide human living quarters therein between the cab and trailer compartment, said partitioning means separating said living quarters from said trailer compartment;

a door on the rear of the trailer body providing access to said trailer compartment; and a door on the side of the trailer body providing access to said living quarters.

3. The invention of claim 1, wherein said floor is approximately one foot above the ground.

* * * * *